United States Patent
Kufluk et al.

(10) Patent No.: US 7,904,552 B2
(45) Date of Patent: Mar. 8, 2011

(54) MANAGING A SERVER-BASED DIRECTORY OF WEB SERVICES

(75) Inventors: Bernard Zdzislaw Kufluk, Southampton (GB); John Colgrave, Chandlers Ford (GB); Bing Bing Du, Beijing (CN); Xiaoqiang Hou, Bejing (CN)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 12/244,247

(22) Filed: Oct. 2, 2008

(65) Prior Publication Data

US 2010/0088403 A1   Apr. 8, 2010

(51) Int. Cl.
G06F 15/16 (2006.01)
G06F 15/173 (2006.01)
G06F 15/177 (2006.01)

(52) U.S. Cl. ........... 709/224; 709/217; 709/203; 379/68; 707/603

(58) Field of Classification Search .......... 709/217–228, 709/200–203; 379/88.04; 707/603
See application file for complete search history.

(56) References Cited

U.S. PATENT DOCUMENTS

| | | | |
|---|---|---|---|
| 2007/0033640 A1* | 2/2007 | Herness et al. | 726/5 |
| 2008/0065656 A1* | 3/2008 | Theeten et al. | 707/100 |
| 2008/0065683 A1* | 3/2008 | Theeten | 707/102 |
| 2008/0091712 A1* | 4/2008 | Daherkar et al. | 707/103 R |
| 2008/0148299 A1* | 6/2008 | Daherkar et al. | 719/330 |
| 2009/0070853 A1* | 3/2009 | Chung et al. | 726/1 |
| 2009/0077615 A1* | 3/2009 | Chung et al. | 726/1 |
| 2009/0193096 A1* | 7/2009 | Boyer et al. | 709/217 |
| 2009/0268883 A1* | 10/2009 | Agapi et al. | 379/88.04 |
| 2009/0328039 A1* | 12/2009 | Miller et al. | 718/100 |
| 2010/0082565 A1* | 4/2010 | Breeds et al. | 707/705 |

* cited by examiner

*Primary Examiner* — Haresh N Patel
(74) *Attorney, Agent, or Firm* — Steven L. Nichols; Van Cott, Bagley, Cornwall & McCarthy P.C.

(57) ABSTRACT

A method and computer program product for defining at least one target system. The at least one target system is accessed to identify one or more web services available via the at least one target system, thus defining one or more available services. Information concerning the one or more available web services is identified. At least a portion of the information concerning the one or more available web services is published within a web services directory.

18 Claims, 8 Drawing Sheets

MANAGING A SERVER-BASED DIRECTORY OF WEB SERVICES

TECHNICAL FIELD

This disclosure relates to web service registries and repositories and, more particularly, to automatically-updating web service registries and repositories.

BACKGROUND

Often, in enterprise environments, various web services may be simultaneously deployed and running. Unfortunately, these web services may be underutilized because users within the enterprise environment simply do not know that such web services are available.

Accordingly, web service registries and repositories act as a centralized storage location for storing web service definitions and web service metadata. Unfortunately, these web service registries and repositories are not automatically updated and are often out of date or inaccurate. Accordingly, in order to maintain the accuracy of these web service registries and repositories, the web service registries and repositories must be manually updated by an administrator.

SUMMARY OF DISCLOSURE

In a first implementation, a method includes defining at least one target system. The at least one target system is accessed to identify one or more web services available via the at least one target system, thus defining one or more available services. Information concerning the one or more available web services is identified. At least a portion of the information concerning the one or more available web services is published within a web services directory.

One or more of the following features may be included. Identifying information concerning the one or more available web services may include one or more of: retrieving information concerning the one or more available web services from the at least one target system; and generating information concerning the one or more available web services.

The one or more web services available via the at least one target system may be defined via a web services description language (WSDL) file. The one or more web services available via the at least one target system may be defined via a service component architecture (SCA) module.

The SCA module may define one or more of: a WSDL file; a library file; and a module file. The information identified concerning the one or more available services may include one or more of: a WSDL file; an SCA module; application metadata for identifying an enterprise application through which the one or more available services is available; system metadata for identifying the target system on which the enterprise application is executed; and status metadata for defining the status of the one or more available services.

Publishing at least a portion of the information concerning the one or more available web services within a web services directory may include: graphically depicting at least a portion of the information concerning the one or more available web services within the web services directory. Publishing at least a portion of the information concerning the one or more available web services within a web services directory may include: making available for processing at least a portion of the information concerning the one or more available web services within the web services directory.

The web services directory may include a services registry and repository. The information identified concerning the one or more available services may be filtered to remove redundant web service information prior to publishing at least a portion of the information concerning the one or more available web services within the web services directory.

In another implementation, a computer program product resides on a computer readable medium that has a plurality of instructions stored on it. When executed by a processor, the instructions cause the processor to perform operations including defining at least one target system. The at least one target system is accessed to identify one or more web services available via the at least one target system, thus defining one or more available services. Information concerning the one or more available web services is identified. At least a portion of the information concerning the one or more available web services is published within a web services directory.

One or more of the following features may be included. Identifying information concerning the one or more available web services may include one or more of: retrieving information concerning the one or more available web services from the at least one target system; and generating information concerning the one or more available web services.

The one or more web services available via the at least one target system may be defined via a web services description language (WSDL) file. The one or more web services available via the at least one target system may be defined via a service component architecture (SCA) module.

The SCA module may define one or more of: a WSDL file; a library file; and a module file. The information identified concerning the one or more available services may include one or more of: a WSDL file; an SCA module; application metadata for identifying an enterprise application through which the one or more available services is available; system metadata for identifying the target system on which the enterprise application is executed; and status metadata for defining the status of the one or more available services.

Publishing at least a portion of the information concerning the one or more available web services within a web services directory may include: graphically depicting at least a portion of the information concerning the one or more available web services within the web services directory. Publishing at least a portion of the information concerning the one or more available web services within a web services directory may include: making available for processing at least a portion of the information concerning the one or more available web services within the web services directory.

The web services directory may include a services registry and repository. The information identified concerning the one or more available services may be filtered to remove redundant web service information prior to publishing at least a portion of the information concerning the one or more available web services within the web services directory.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

System Overview

Figure 1:
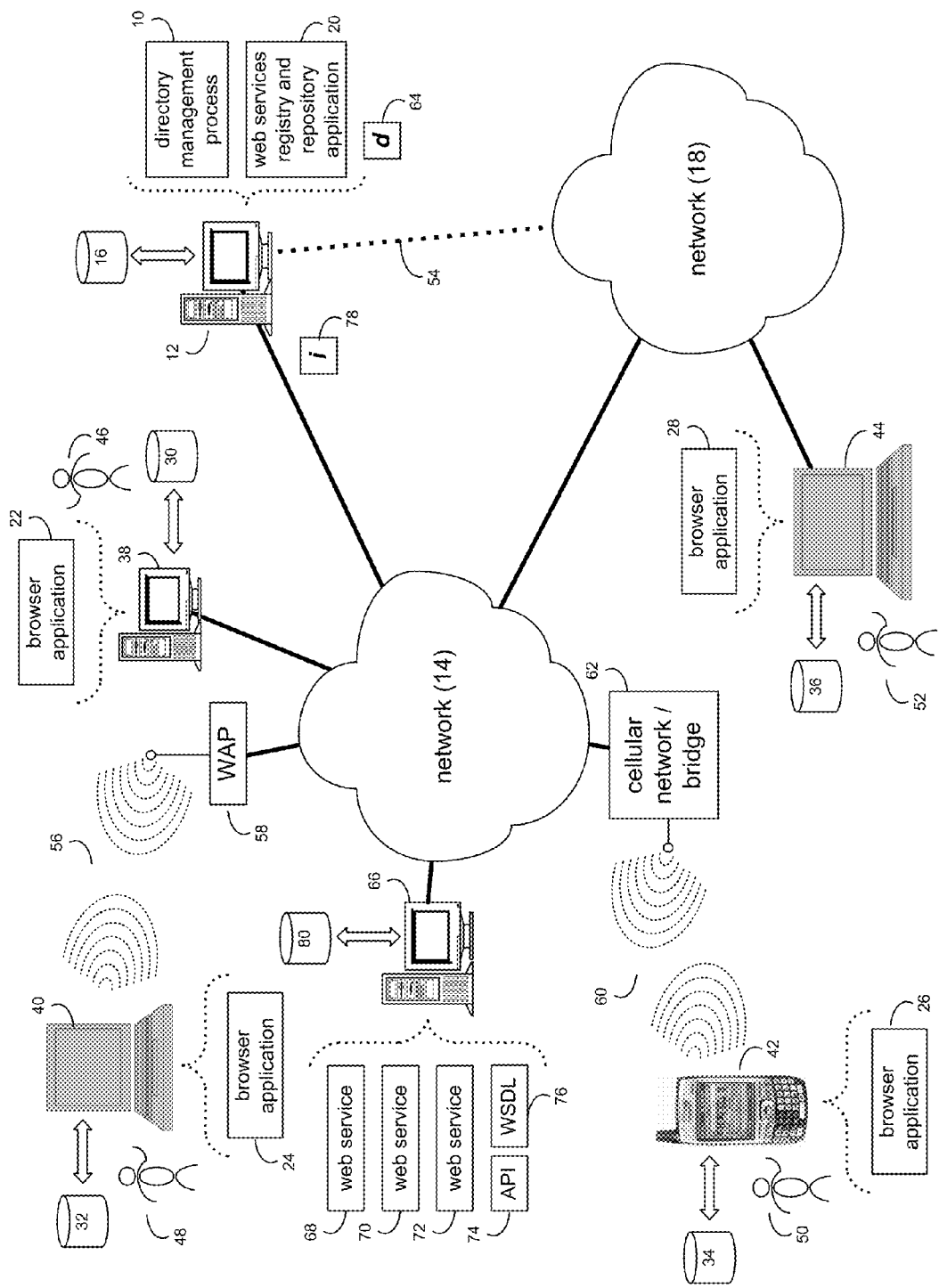
FIG. 1 is a diagrammatic view of a directory management process coupled to a distributed computing network.

Referring to FIG. 1, there is shown directory management process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft Windows XP Server™; Novell Netware™; or Redhat Linux™, for example.

As will be discussed below in greater detail, directory management process 10 may define at least one target system. The at least one target system may be accessed to identify one or more web services available via the at least one target system, thus defining one or more available services. Information concerning the one or more available web services may be identified. At least a portion of the information concerning the one or more available web services may be published within a web services directory.

The instruction sets and subroutines of directory management process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: IBM WebSphere™, Microsoft IIS™, Novell Webserver™, or Apache Webserver™, that allows for HTTP (i.e., HyperText Transfer Protocol) access to server computer 12 via network 14. Network 14 may be connected to one or more secondary networks (e.g., network 18), examples of which may include but are not limited to: a local area network; a wide area network; or an intranet, for example.

Server computer 12 may execute web services registry and repository (WSRR) application 20, examples of which may include but are not limited to IBM WebSphere™ services registry and repository. WSRR application 20 may allow an organization to store, manage, and access their web service information so that the corresponding web services may be efficiently utilized by the employees of the organization. Directory management process 10 may be a stand alone application that interfaces with WSRR application 20 or an applet/application that is executed within WSRR application 20.

The instruction sets and subroutines of WSRR application 20, which may be stored on storage device 16 coupled to server computer 12 may be executed by one or more processors (not shown) and one or more memory architectures (not shown) incorporated into server computer 12.

The instruction sets and subroutines of browser applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID arrays; random access memories (RAM); read-only memories (ROM), compact flash (CF) storage devices, secure digital (SD) storage devices, and memory stick storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown). Using browser applications 22, 24, 26, 28, users 46, 48, 50, 52 (respectively) may access and browse one or more services directories (to be discussed below in greater detail) maintained by WSRR application 20.

Users 46, 48, 50, 52 may access WSRR application 20 directly through the device on which the browsing application (e.g., browsing applications 22, 24, 26, 28) is executed, namely client electronic devices 38, 40, 42, 44, for example. Users 46, 48, 50, 52 may access WSRR application 20 directly through network 14 or through secondary network 18. Further, server computer 12 (i.e., the computer that executes WSRR application 20) may be connected to network 14 through secondary network 18, as illustrated with link line 54 (shown in phantom).

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, or a custom operating system.

For the following discussion, browser application 22 is going to be described for illustrative purposes. However, this is not intended to be a limitation of this disclosure, as other browsing applications (e.g., browsing applications 24, 26, 28) may be equally utilized.

Assume for illustrative purposes that WSRR application 20 maintains web services directory 64 (e.g., a services registry & repository) that identifies the various web services that are available for use by e.g., users 46, 48, 50, 52. Server computer 66 may be a web server that is configured to provide three web services, namely web service 68, 70, 72. Web services 68, 70, 72 may be accessible by users 46, 48, 50, 52 via browser applications 22, 24, 26, 28 executed on client electronic devices 38, 40, 42, 44.

When accessing one or more of web services 68, 70, 72, a standardized protocol may be used. For example, SOAP (i.e., Simple Object Access Protocol) may be used to couple a client electronic device (e.g., desktop computer 38, laptop computer 40, personal digital assistant 42, and notebook computer 44) to web services 68, 70, 72.

As is known in the art, the SOAP protocol allows XML (eXtensible Markup Language) messages to be exchanged across computer networks (e.g., networks 14, 18). These messages may be exchanged using HTTP (i.e., HyperText Transfer Protocol).

SOAP may use the RPC (i.e., Remote Procedure Protocol) process, in which a first network node (e.g. laptop computer 40) sends a request message to another network node (e.g., server computer 66), and the second network node (e.g., server computer 66) sends a response message to the first network node (e.g., laptop computer 40). While the system is described above as utilizing SOAP, other configurations are possible and are considered to be within the scope of this disclosure. For example, other protocols may be used, such as JSON (i.e., Java Script Object Notation), REST (i.e., REpresentational State Transfer), and XML-RPC (i.e., eXtensible Markup Language Remote Procedure Protocol).

Server computer 66 may execute API 74 to enable communication between server computer 66 and e.g., desktop computer 38, laptop computer 40, personal digital assistant 42, and notebook computer 44 via e.g., SOAP. While a single API (i.e., API 74) is shown, this is for illustrative purposes only, as other configurations are possible and are considered to be within the scope of this disclosure. For example, a unique API may be utilized for each web service available.

API 74 may act as an interface for the various web services available via server computer 66, thus allowing requests for services (e.g., web services 68, 70, 72) to be made by other computer programs (e.g., browser applications 22, 24, 26, 28) executed on e.g., desktop computer 38, laptop computer 40, personal digital assistant 42, and notebook computer 44.

API 74 may describe how browser applications 22, 24, 26, 28 may access e.g., web services 68, 70, 72 without granting access to the source code of the services or requiring a detailed understanding of the internal workings of the services.

Assume for illustrative purposes that web service 68 is a stock quote service; web service 70 is an insurance quote service; and web service 72 is an address lookup service. Accordingly, API 74 may be configured to enable e.g., user 48 of e.g., laptop computer 40 to obtain a stock quote for e.g., 1,000 shares of IBM stock. API 74 may be configured to further allow user 50 of personal digital assistant 42 to obtain a quote for $1,000,000 of term life insurance. Additionally, API 74 may be configured to further allow user 52 of notebook computer 44 to determine an address of a store within Armonk, N.Y.

When configuring a client electronic device (e.g., laptop computer 40) to access e.g., web services 68, 70, 72 offered by server computer 66, a standardized protocol may be established between the two devices (e.g., laptop computer 40 and server computer 66). As discussed above, an example of such a standardized protocol is SOAP. Once the standardized protocol is established and the devices are capable of communicating with each other, one or more WSDL (i.e., Web Services Description Language) files (e.g., WSDL file 76) resident on e.g., storage device 80 may be processed by the client electronic device (e.g., laptop computer 40) to allow for communication between laptop computer 40 and server computer 66.

WSDL file 76 may be a service description (typically XML) describing how a client device may communicate with a web service. For example, WSDL 78 may describe how browser application 24 (and, therefore, laptop computer 40) may communicate with e.g., web service 68 via API 74. For example, WSDL 78 may define e.g., the protocol bindings and message formats required to interact with web service 68. Typically, the supported operations and messages are described abstractly, and then bound to the network protocol (e.g., SOAP). Accordingly, WSDL 78 may define the public interface for e.g., web service 68.

Accordingly, when configuring e.g., laptop computer 40 to access e.g., web service 68, once communication is established (using a standardized protocol) between e.g., server computer 66 and e.g., laptop computer 40, laptop computer 40 may obtain one or more WSDL files (e.g., WSDL file 76) from server computer 66 and may process the obtained WSDL file(s) to effectuate communication between the two systems (i.e., laptop computer 40 and server computer 66). Examples of WSDL files are as follows:

Stock Quote WSDL File:

```
<?xml version="1.0" encoding="UTF-8"?>
<wsdl:definitions          targetNamespace="http://stockquote"
xmlns:apachesoap="http://xml.apache.org/xml-soap"    xmlns:impl="http://stockquote"
xmlns:intf="http://stockquote"       xmlns:wsdl="http://schemas.xmlsoap.org/wsdl/"
xmlns:wsdlsoap="http://schemas.xmlsoap.org/wsdl/soap/"
xmlns:xsd="http://www.w3.org/2001/XMLSchema">
    <wsdl:types>
        <schema   elementFormDefault="qualified"   targetNamespace="http://stockquote"
xmlns="http://www.w3.org/2001/XMLSchema"
xmlns:apachesoap="http://xml.apache.org/xml-soap"    xmlns:impl="http://stockquote"
xmlns:intf="http://stockquote" xmlns:wsdl="http://schemas.xmlsoap.org/wsdl/">
            <element name="getQuote">
                <complexType>
                    <sequence>
                        <element name="symbol" nillable="true" type="xsd:string"/>
                    </sequence>
                </complexType>
            </element>
```

```
            <element name="getQuoteResponse">
                <complexType>
                    <sequence>
                        <element name="getQuoteReturn" type="xsd:float"/>
                    </sequence>
                </complexType>
            </element>
        </schema>
    </wsdl:types>
        <wsdl:message name="getQuoteRequest">
            <wsdl:part element="intf:getQuote" name="parameters"/>
        </wsdl:message>
        <wsdl:message name="getQuoteResponse">
            <wsdl:part element="intf:getQuoteResponse" name="parameters"/>
        </wsdl:message>
        <wsdl:portType name="StockQuoteService">
            <wsdl:operation name="getQuote">
                <wsdl:input message="intf:getQuoteRequest" name="getQuoteRequest"/>
                <wsdl:output message="intf:getQuoteResponse" name="getQuoteResponse"/>
            </wsdl:operation>
        </wsdl:portType>
        <wsdl:binding                         name="StockQuoteServiceSoapBinding"
type="intf:StockQuoteService">
            <wsdlsoap:binding                                    style="document"
transport="http://schemas.xmlsoap.org/soap/http"/>
            <wsdl:operation name="getQuote">
                <wsdlsoap:operation soapAction=""/>
                <wsdl:input name="getQuoteRequest">
                    <wsdlsoap:body use="literal"/>
                </wsdl:input>
                <wsdl:output name="getQuoteResponse">
                    <wsdlsoap:body use="literal"/>
                </wsdl:output>
            </wsdl:operation>
        </wsdl:binding>
        <wsdl:service name="StockQuoteServiceService">
            <wsdl:port                    binding="intf:StockQuoteServiceSoapBinding"
name="StockQuoteService">
                <wsdlsoap:address
location="http://localhost:9080/WebProject/services/StockQuoteService"/>
            </wsdl:port>
        </wsdl:service>
</wsdl:definitions>
```

Address Lookup WSDL File:

```
<?xml version="1.0" encoding="UTF-8"?>
<wsdl:definitions    targetNamespace="http://addr.multiejbjar.test.wsfvt.ws.ibm.com"
xmlns="http://schemas.xmlsoap.org/wsdl/"
xmlns:apachesoap="http://xml.apache.org/xml-soap"
xmlns:impl="http://addr.multiejbjar.test.wsfvt.ws.ibm.com"
xmlns:intf="http://addr.multiejbjar.test.wsfvt.ws.ibm.com"
xmlns:soapenc="http://schemas.xmlsoap.org/soap/encoding/"
xmlns:wsdl="http://schemas.xmlsoap.org/wsdl/"
xmlns:wsdlsoap="http://schemas.xmlsoap.org/wsdl/soap/"
xmlns:xsd="http://www.w3.org/2001/XMLSchema">
    <wsdl:types>
        <schema           targetNamespace="http://addr.multiejbjar.test.wsfvt.ws.ibm.com"
xmlns="http://www.w3.org/2001/XMLSchema">
            <import namespace="http://schemas.xmlsoap.org/soap/encoding/"/>
            <complexType name="Address">
                <sequence>
                    <element name="phoneNumber" nillable="true" type="impl:Phone"/>
                    <element name="streetNum" type="xsd:int"/>
                    <element name="zip" type="xsd:int"/>
                    <element name="streetName" nillable="true" type="xsd:string"/>
                    <element name="state" nillable="true" type="impl:StateType"/>
                    <element name="city" nillable="true" type="xsd:string"/>
                </sequence>
            </complexType>
            <complexType name="Phone">
                <sequence>
                    <element name="areaCode" type="xsd:int"/>
                    <element name="exchange" nillable="true" type="xsd:string"/>
                    <element name="number" nillable="true" type="xsd:string"/>
```

-continued

```
            </sequence>
         </complexType>
         <simpleType name="StateType">
            <restriction base="xsd:string">
               <enumeration value="OH"/>
               <enumeration value="IN"/>
               <enumeration value="TX"/>
            </restriction>
         </simpleType>
         <element name="Address" nillable="true" type="impl:Address"/>
      </schema>
   </wsdl:types>
      <wsdl:message name="getAddressFromNameResponse">
            <wsdl:part name="getAddressFromNameReturn" type="intf:Address"/>
      </wsdl:message>
      <wsdl:message name="addEntryRequest">
            <wsdl:part name="in0" type="xsd:string"/>
            <wsdl:part name="in1" type="intf:Address"/>
      </wsdl:message>
      <wsdl:message name="addEntryResponse">
      </wsdl:message>
      <wsdl:message name="getAddressFromNameRequest">
            <wsdl:part name="in0" type="xsd:string"/>
      </wsdl:message>
      <wsdl:portType name="AddressBook">
            <wsdl:operation name="getAddressFromName" parameterOrder="in0">
               <wsdl:input                message="intf:getAddressFromNameRequest" name="getAddressFromNameRequest"/>
               <wsdl:output                message="intf:getAddressFromNameResponse" name="getAddressFromNameResponse"/>
            </wsdl:operation>
            <wsdl:operation name="addEntry" parameterOrder="in0 in1">
               <wsdl:input message="intf:addEntryRequest" name="addEntryRequest"/>
               <wsdl:output message="intf:addEntryResponse" name="addEntryResponse"/>
            </wsdl:operation>
      </wsdl:portType>
      <wsdl:binding name="AddressBookSoapBinding" type="intf:AddressBook">
            <wsdlsoap:binding style="rpc" transport="http://schemas.xmlsoap.org/soap/http"/>
            <wsdl:operation name="getAddressFromName">
               <wsdlsoap:operation soapAction=""/>
               <wsdl:input name="getAddressFromNameRequest">
                  <wsdlsoap:body encodingStyle="http://schemas.xmlsoap.org/soap/encoding/" namespace="http://addr.multiejbjar.test.wsfvt.ws.ibm.com" use="encoded"/>
               </wsdl:input>
               <wsdl:output name="getAddressFromNameResponse">
                  <wsdlsoap:body encodingStyle="http://schemas.xmlsoap.org/soap/encoding/" namespace="http://addr.multiejbjar.test.wsfvt.ws.ibm.com" use="encoded"/>
               </wsdl:output>
            </wsdl:operation>
            <wsdl:operation name="addEntry">
               <wsdlsoap:operation soapAction=""/>
               <wsdl:input name="addEntryRequest">
                  <wsdlsoap:body encodingStyle="http://schemas.xmlsoap.org/soap/encoding/" namespace="http://addr.multiejbjar.test.wsfvt.ws.ibm.com" use="encoded"/>
               </wsdl:input>
               <wsdl:output name="addEntryResponse">
                  <wsdlsoap:body encodingStyle="http://schemas.xmlsoap.org/soap/encoding/" namespace="http://addr.multiejbjar.test.wsfvt.ws.ibm.com" use="encoded"/>
               </wsdl:output>
            </wsdl:operation>
      </wsdl:binding>
      <wsdl:service name="AddressBookService">
            <wsdl:port binding="intf:AddressBookSoapBinding" name="AddressBook">
               <wsdlsoap:address location="http://localhost:9080/join/services/AddressBook"/>
            </wsdl:port>
      </wsdl:service>
</wsdl:definitions>
```

When generating WSDL files, the manner in which the WSDL files are configured may vary based upon the intent of the programmer. For example, a single WSDL file may be designed to effectuate access for all services/functions available via server computer 66 (namely web services 68, 70, 72). Alternatively, separate WSDL files may be made available for each service/function available within server computer 66. For example, a first WSDL file may be made available for web service 68; a second WSDL file may be made available for web service 70; and a third WSDL file may be made available for web service 72.

The Directory Management Process:

As stated above and as will be discussed below in greater detail, directory management process 10 may define at least one target system. The at least one target system may be accessed to identify one or more web services available via the at least one target system, thus defining one or more available services. Information concerning the one or more available web services may be identified. At least a portion of the information concerning the one or more available web services may be published within a web services directory.

Assume for this example that server computer 66 has not yet been indexed by WSRR application 20 and, therefore, web services 66, 68, 70 are not published/included/defined within web services directory 64. For this illustrative example, assume that user 46 is an administrator of WSRR application 20 and would like to have web services 68, 70, 72 defined within web services directory 64.

Figure 2:
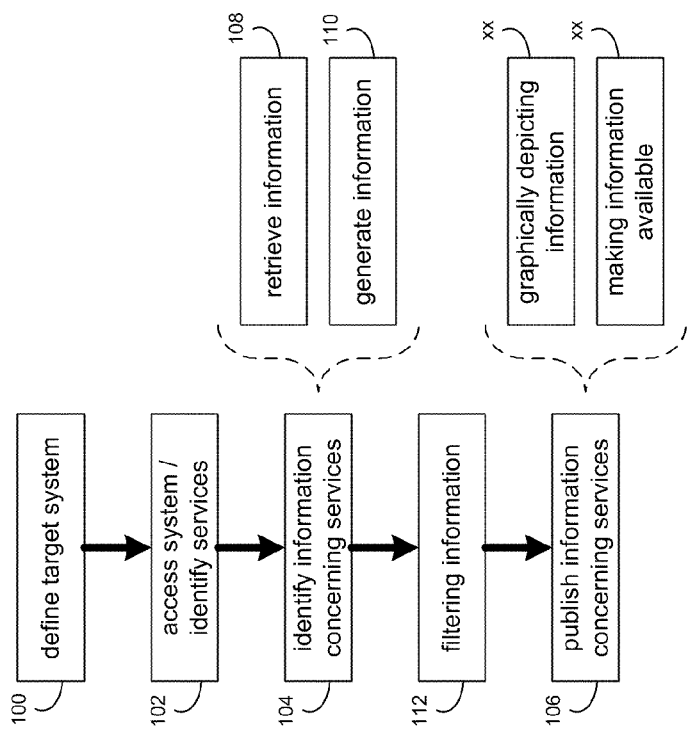
FIG. 2 is a flowchart of the directory management process of FIG. 1.
Figure 3:
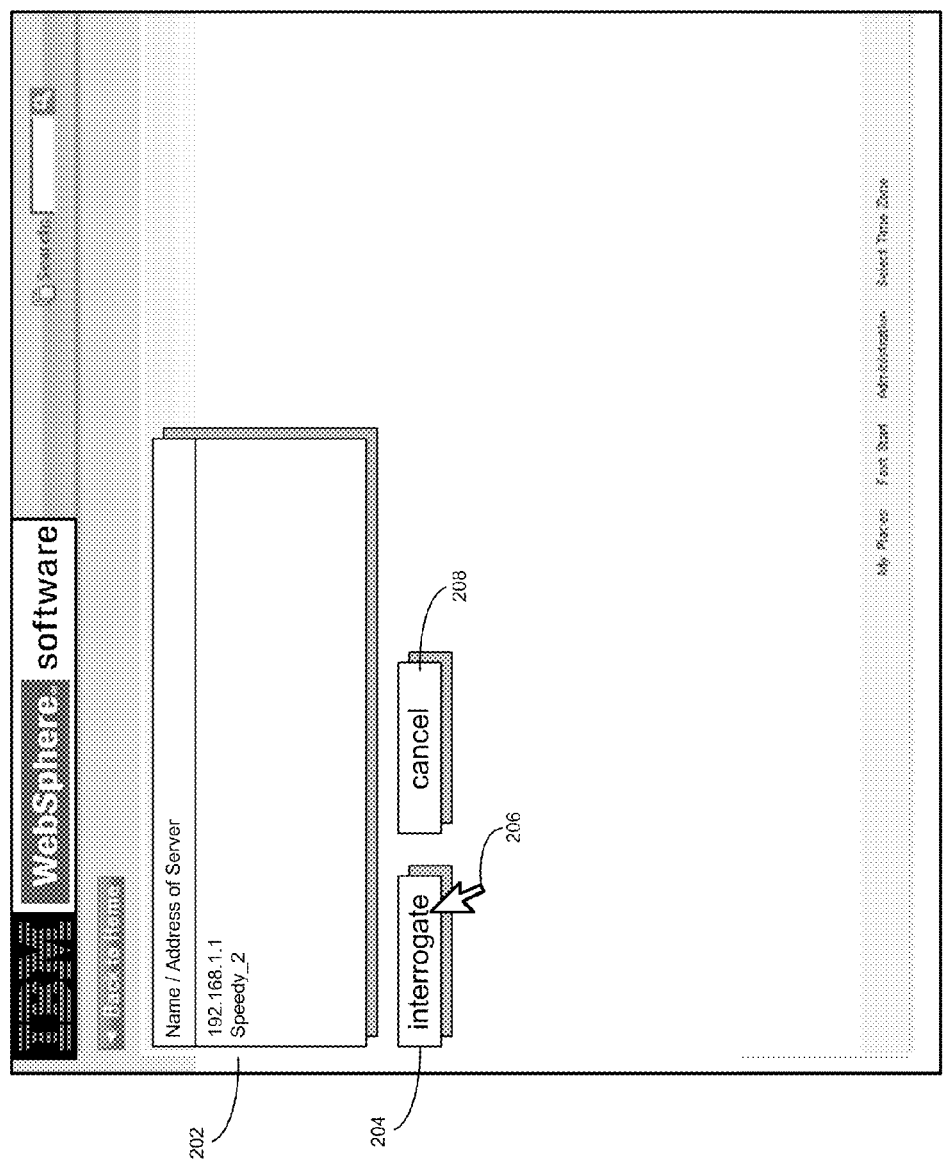
FIG. 3 is a diagrammatic view of a display screen rendered by the directory management process of FIG. 1.

Referring also to FIGS. 2 & 3, user 46 may utilize directory management process 10 to define 100 at least one target system for interrogation by directory management process 10. Specifically, user 46 may define 100 one or more target systems (e.g., server computer 66) for directory management process 10 to analyze. When defining 100 the target system(s), user 46 may utilize user interface 200 rendered by directory management process 10. The manner in which the target system(s) are defined 100 within user interface 200 may vary depending on the manner in which user interface 200 is configured. For example, user interface 200 may be configured to e.g., allow user 46 to define 100 server computer 66 within defining field 202 via a unique IP (i.e., internet protocol) address (e.g., 192.168.1.1) or a unique computer name (e.g., speedy_2) within a computer domain.

While directory management process 10 is described as allowing user 46 to define 100 the target system via IP addresses and/or computer names, this is for illustrative purposes only, as other configurations are possible. For example, a URL may be able to define a target system provided that the URL definitively defines a unique target system (or a plurality of systems that each offer the same web services).

Once sufficiently defined 100, user 46 may select "interrogate" button 204 (using onscreen pointer 206 controllable via e.g., a mouse; not shown) to initiate directory management process 10 accessing 102 the target system (e.g., server computer 66) to identify one or more web services available via e.g., server computer 66. Alternatively, user 46 may select "cancel" button 208 with onscreen pointer 206.

As discussed above and in this particular example, server computer 66 is configured to provide three web services, namely web service 68, 70, 72. Accordingly, upon directory management process 10 accessing 102 server computer 66, directory management process 10 may identify web services 68, 70, 72 as being available via server computer 66.

Once directory management process 10 identifies the specific web services (e.g., web services 68, 70, 72) available via server computer 66, directory management process 10 may identify 104 information 78 concerning web services 68, 70, 72. As will be discussed below in greater detail, at least a portion of information 78 concerning web services 68, 70, 72 may be published 106 within web services directory 64.

The various web services (e.g., web services 68, 70, 72) available via server computer 66 may be defined using various methodologies, examples of which may include but are not limited to: one or more web services description language (WSDL) files and/or one or more service component architecture (SCA) modules, wherein SCA modules may include: a WSDL file; a library file; and another module file.

Accordingly, the information identified 104 (by directory management process 10) concerning the one or more available web services (e.g., web services 68, 70, 72) may include one or more of: a WSDL file; an SCA module; application metadata for identifying an enterprise application (e.g., a stock quote application; not shown) through which one or more available services (e.g., a stock quote service) is available; system metadata for identifying the target system (e.g., server computer 66) on which the enterprise application (e.g., the stock quote application; not shown) is executed; and status metadata for defining the status (e.g., online/offline) of the one or more available services (e.g., the stock quote service).

Once directory management process 10 identifies 104 information 74 concerning web services 68, 70, 72, all or a portion of information 74 may be retrieved 108 from e.g., server computer 66 and stored on server computer 12 (i.e., the computer that executes directory management process 10). Additionally, directory management process 10 may generate 110 at least a portion of information 74 based, at least in part, upon the information retrieved 108 from directory management process 10. Examples of information generated by directory management process 10 may include but are not limited to a date/time stamp concerning the date and time that information 74 was retrieved 108 from e.g., server computer 66; and the above-described status metadata.

At least a portion of information 74 retrieved from e.g., server computer 66 concerning web services 68, 70, 72 may be filtered 112 to remove redundant information. For example, assume that a single service (e.g., web service 68) is described using both a WSDL file (for a first type of system) and a SCA module (for a second type of system). As discussed above, SCA modules may include: a WSDL file; a library file; and another module file. Accordingly, when identifying 104 and retrieving information 74 concerning web service 68, a redundant information condition may occur. Specifically, two identical WSDL files may be included within information 74, one the stand alone WSDL file and the second being the WSDL file included within the SCA module.

Accordingly, directory management process 10 may filter 112 the redundant copy of the WSDL file from information 74. When filtering information 74, directory management process 10 may utilize one of many known file comparison techniques (e.g., CRC checks, byte-by-byte comparisons) to determine if any of the individual files included within information 74 are redundant. If so, directory management process 10 may remove the redundant file.

Once directory management process 10 filters 112 information 74 (if filtering is performed), directory management process 10 may publish all or a portion of information 74 within web services directory 64.

Concerning the manner in which directory management process 10 publishes all or a portion of information 74 to web services directory 64, all or a portion of information 74 may be graphically depicted within web services directory 64.

Additionally/alternatively, all or a portion of information 74 may be made available for processing by e.g., laptop computer 40.

Figure 4:
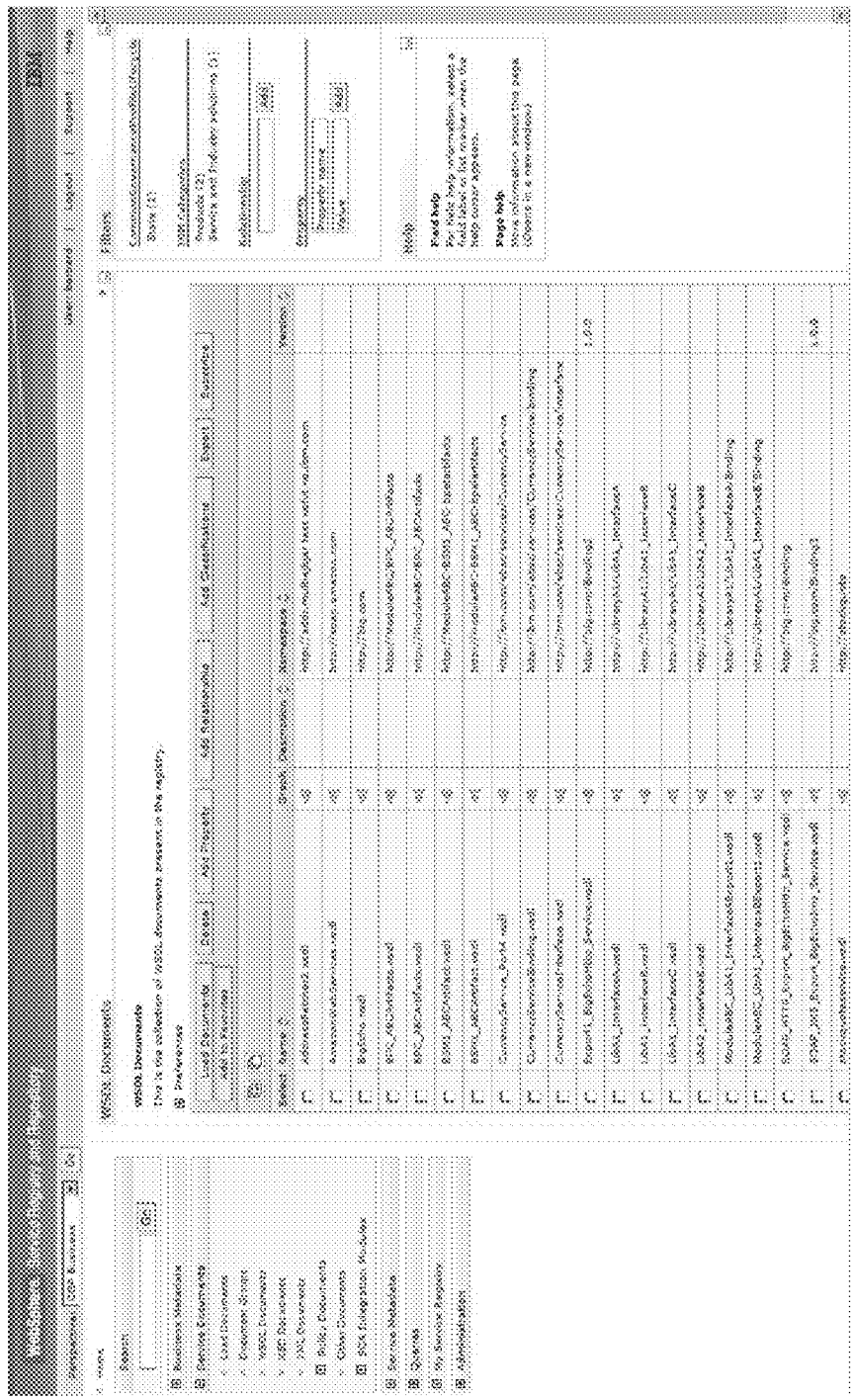
FIG. 4 is a diagrammatic view of a display screen rendered by the directory management process of FIG. 1.
Figure 5:
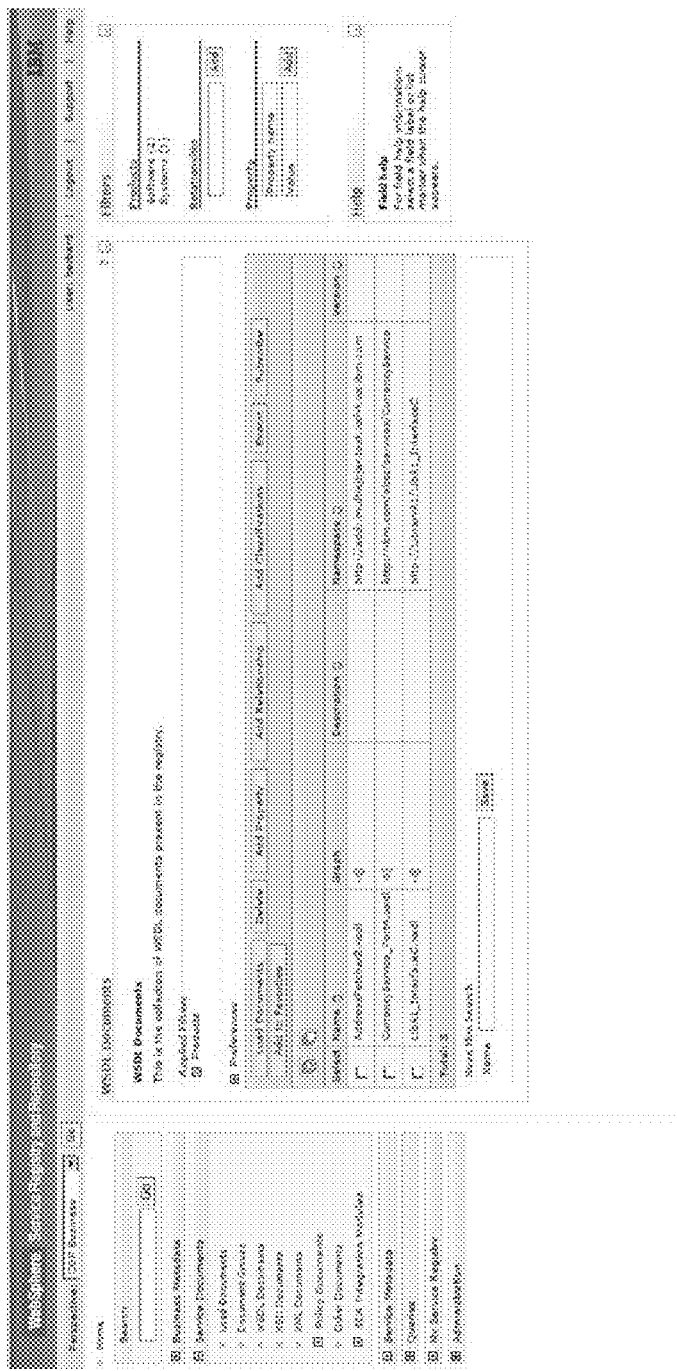
FIG. 5 is a diagrammatic view of a display screen rendered by the directory management process of FIG. 1.
Figure 6:
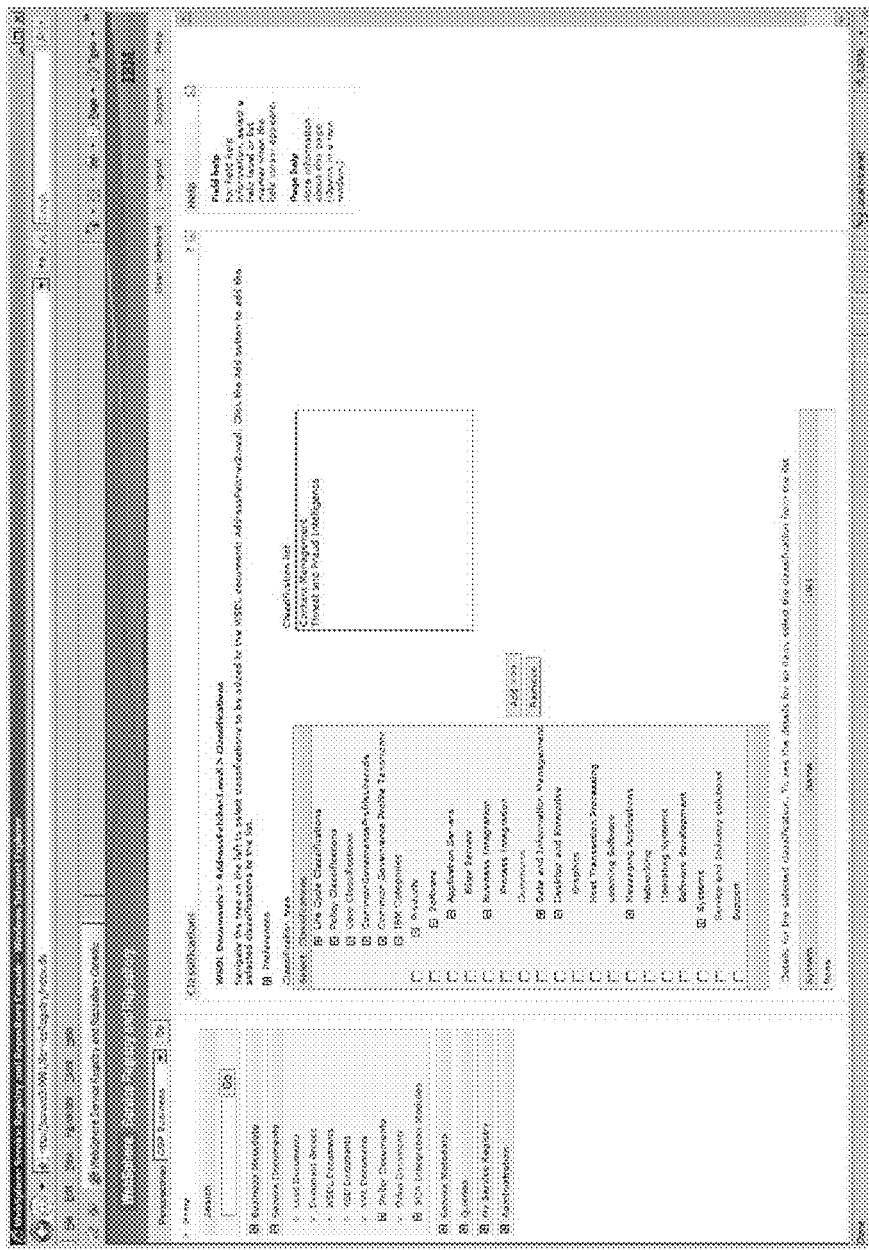
FIG. 6 is a diagrammatic view of a display screen rendered by the directory management process of FIG. 1.
Figure 7:
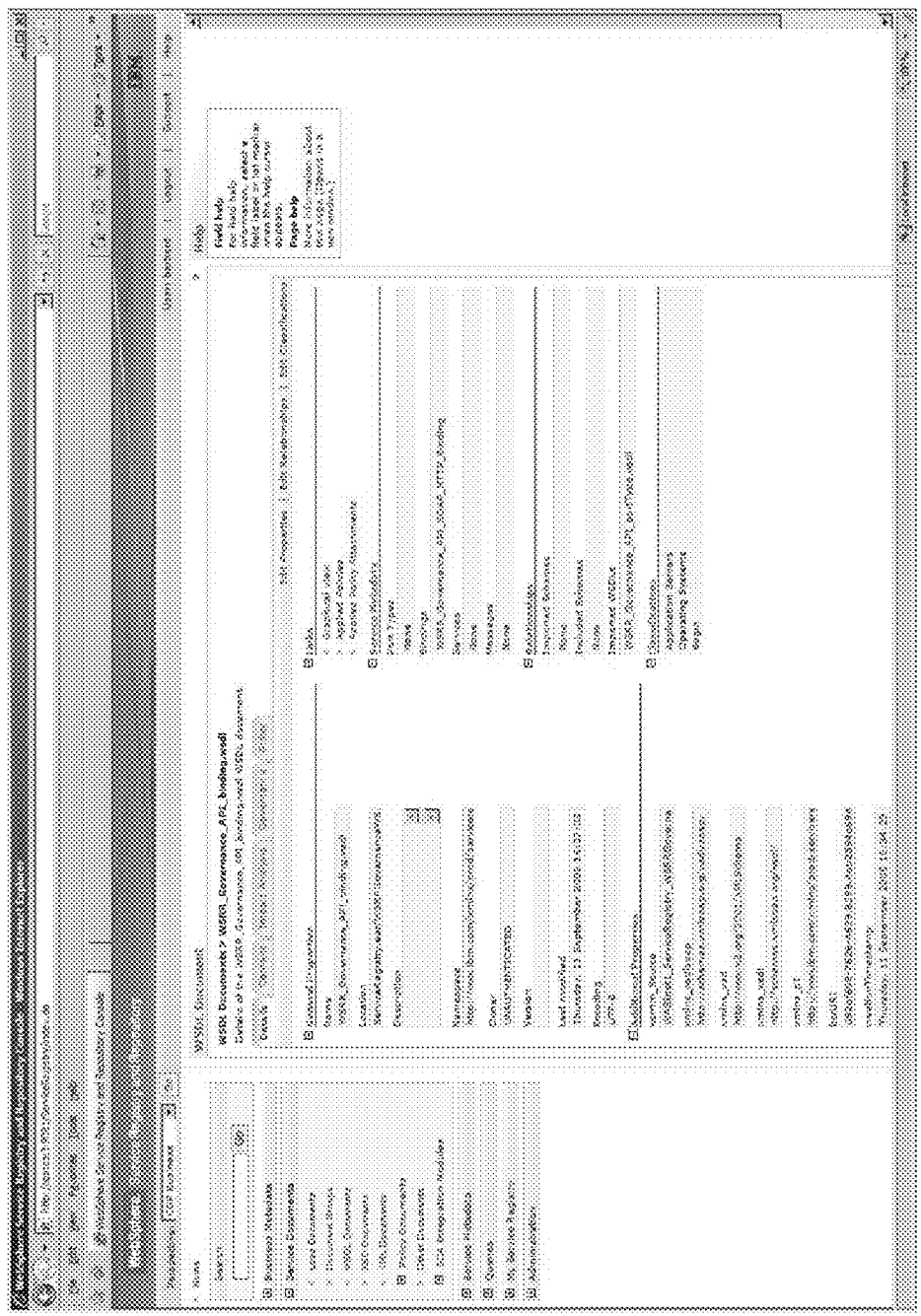
FIG. 7 is a diagrammatic view of a display screen rendered by the directory management process of FIG. 1.

For example, once directory management process 10 publishes 106 all or a portion of information 74 within web services directory 64, one or more of users 46, 48, 50 52 may access web services directory 64 using one or more of browser applications 22, 24, 26, 28 (respectively). Once web services directory 64 is accessed, the data included within web services directory 64 may be presented to the user in various ways, such as in table 300 (FIG. 4) and table 400 (FIG. 5), in which the WSDL files included within web services directory 64 are presented in tabular form and associated with various namespaces (e.g., http://soap.amazon.com). Additionally/alternatively, the data included within web services directory 64 may be presented to the user in tabular form (see table 500, FIG. 6 & table 600, FIG. 7), in which one or more details of a particular WSDL file (e.g., AddressFetcher2.wsdl & WSRR_Goverance_API_binding.wsdl).

Figure 8:
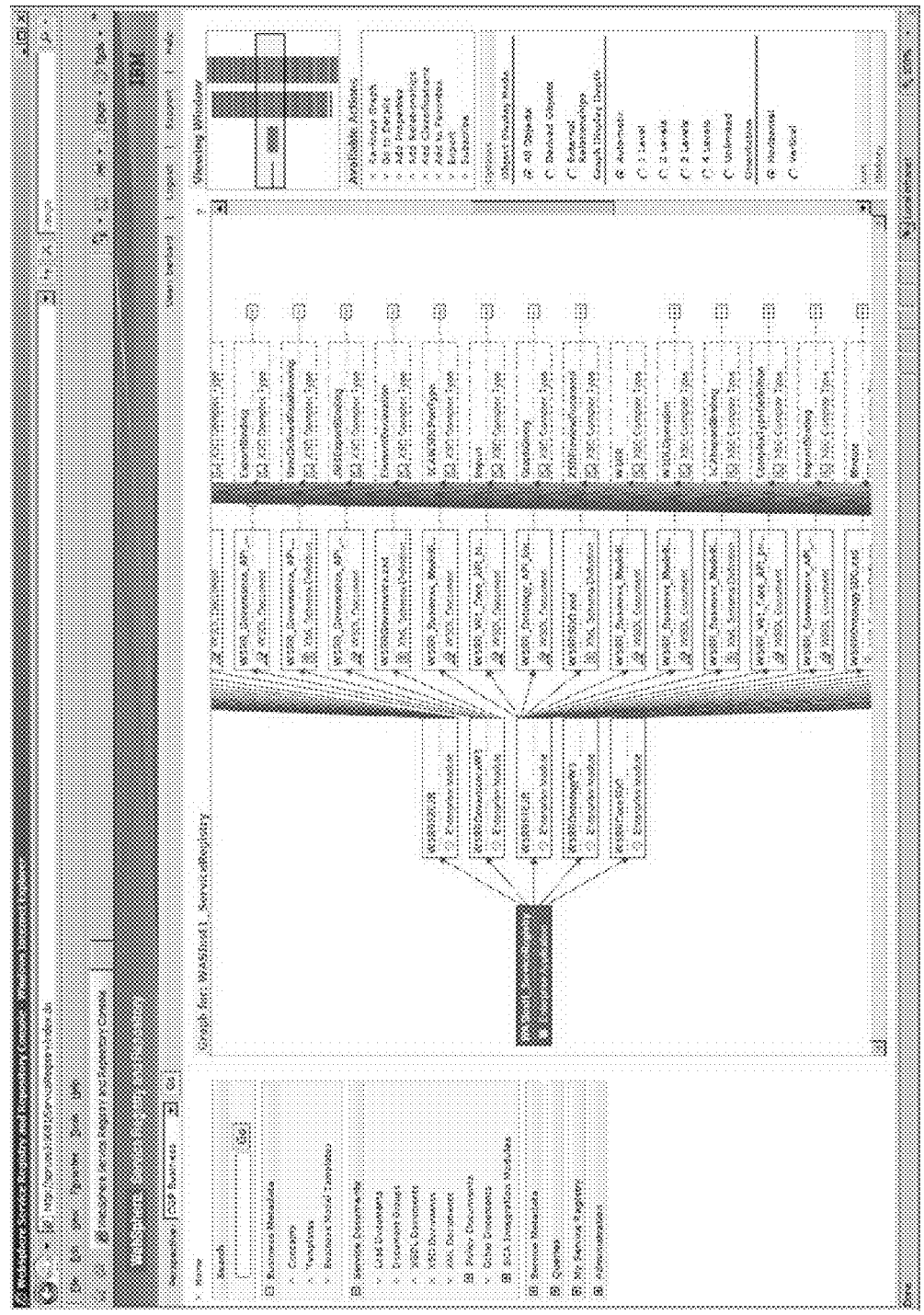
FIG. 8 is a diagrammatic view of a display screen rendered by the directory management process of FIG. 1.

Additionally, directory management process 10 may process (i.e., "shred") at least a portion of information 74 retrieved from e.g., server computer 66 concerning web services 68, 70, 72 to parse information 74 into a series of discrete logical objects (not shown). Once parsed, directory management process 10 may apply the above-described metadata to one or more of the discrete logical objects to define e.g., the enterprise application (e.g., a stock quote application; not shown) and target system (e.g., server computer 66) associated with the discrete logical object. Further, the metadata may define relationships between the above-described logical objects and one or more of the above-described WSDL files, SCA modules, or any portions thereof. Directory management process 10 may render the above-described discrete logical objects in a graphical format as shown in e.g., display screen 700 (FIG. 8).

A number of implementations have been described. Nevertheless, it will be understood that various modifications may be made. Accordingly, other implementations are within the scope of the following claims.

What is claimed is:

1. A method of managing a server-based directory of web services, the method comprising:
   receiving in a server a selection of at least one target system separate from the server;
   accessing the at least one target system with the server to identify each web service available via the at least one target system, thus defining one or more available services;
   identifying information concerning the one or more available web services with said server;
   filtering the information identified concerning the one or more available services to remove redundant web service information; and
   publishing at least a portion of the information concerning the one or more available web services within a web services directory stored on the server.

2. The method of claim 1 wherein identifying information concerning the one or more available web services includes one or more of:
   retrieving information concerning the one or more available web services from the at least one target system; and
   generating information concerning the one or more available web services.

3. The method of claim 1 wherein the one or more web services available via the at least one target system are defined via a web services description language (WSDL) file.

4. The method of claim 1 wherein the one or more web services available via the at least one target system are defined via a service component architecture (SCA) module.

5. The method of claim 4 wherein the SCA module defines one or more of: a WSDL file; a library file; and a module file.

6. The method of claim 1 wherein the information identified concerning the one or more available services includes one or more of:
   a WSDL file;
   an SCA module;
   application metadata for identifying an enterprise application through which the one or more available services is available;
   system metadata for identifying the target system on which the enterprise application is executed; and
   status metadata for defining the status of the one or more available services.

7. The method of claim 1 wherein publishing at least a portion of the information concerning the one or more available web services within a web services directory includes:
   graphically depicting at least a portion of the information concerning the one or more available web services within the web services directory.

8. The method of claim 1 wherein publishing at least a portion of the information concerning the one or more available web services within a web services directory includes:
   making available for processing at least a portion of the information concerning the one or more available web services within the web services directory.

9. The method of claim 1 wherein the web services directory includes a services registry and repository.

10. A computer program product residing on a hardware computer readable medium having a plurality of instructions stored thereon which, when executed by a processor, cause the processor to perform operations comprising:
    receiving a selection of at least one target system;
    accessing the at least one target system to identify each web service available via the at least one target system, thus defining one or more available services;
    identifying information concerning the one or more available web services;
    filtering the information identified concerning the one or more available services to remove redundant web service information; and
    publishing at least a portion of the information concerning the one or more available web services within a web services directory.

11. The computer program product of claim 10 wherein the instructions for identifying information concerning the one or more available web services include instructions for one or more of:
    retrieving information concerning the one or more available web services from the at least one target system; and
    generating information concerning the one or more available web services.

12. The computer program product of claim 10 wherein the one or more web services available via the at least one target system are defined via a web services description language (WSDL) file.

13. The computer program product of claim 10 wherein the one or more web services available via the at least one target system are defined via a service component architecture (SCA) module.

14. The computer program product of claim 13 wherein the SCA module defines one or more of: a WSDL file; a library file; and a module file.

15. The computer program product of claim 10 wherein the information identified concerning the one or more available services includes one or more of:
   a WSDL file;
   an SCA module;
   application metadata for identifying an enterprise application through which the one or more available services is available;
   system metadata for identifying the target system on which the enterprise application is executed; and
   status metadata for defining the status of the one or more available services.

16. The computer program product of claim 10 wherein the instructions for publishing at least a portion of the information concerning the one or more available web services within a web services directory include instructions for:
   graphically depicting at least a portion of the information concerning the one or more available web services within the web services directory.

17. The computer program product of claim 10 wherein the instructions for publishing at least a portion of the information concerning the one or more available web services within a web services directory include instructions for:
   making available for processing at least a portion of the information concerning the one or more available web services within the web services directory.

18. The computer program product of claim 10 wherein the web services directory includes a services registry and repository.

* * * * *